US009233443B2

(12) United States Patent
Moriguchi et al.

(10) Patent No.: US 9,233,443 B2
(45) Date of Patent: Jan. 12, 2016

(54) BEARING PRELOAD STRUCTURE OF MACHINE TOOL

(75) Inventors: Kazutoyo Moriguchi, Iga (JP); Takahiro Nishiki, Iga (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 144 days.

(21) Appl. No.: 13/224,307

(22) Filed: Sep. 1, 2011

(65) Prior Publication Data

US 2012/0082408 A1  Apr. 5, 2012

(30) Foreign Application Priority Data

Sep. 9, 2010  (JP) .................................. 2010-201966

(51) Int. Cl.
| F16C 35/12 | (2006.01) |
| F16C 19/08 | (2006.01) |
| F16C 43/04 | (2006.01) |
| B23Q 1/70 | (2006.01) |
| F16C 19/54 | (2006.01) |

(52) U.S. Cl.
CPC ................ B23Q 1/70 (2013.01); F16C 19/546 (2013.01); F16C 35/12 (2013.01); F16C 2226/60 (2013.01); F16C 2229/00 (2013.01); F16C 2240/70 (2013.01); Y10T 409/309352 (2015.01)

(58) Field of Classification Search
CPC ........... B23Q 1/70; F16C 35/12; F16C 19/54; F16C 19/546; F16C 2240/70; F16C 2226/60; F16C 2229/00
USPC ......... 384/504, 505, 506, 517, 519, 537, 542, 384/551, 563, 510
See application file for complete search history.

(56) References Cited

U.S. PATENT DOCUMENTS

| 1,881,522 A | * | 10/1932 | Guild ............................. 384/519 |
| 1,904,395 A | * | 4/1933 | Whitehead ..................... 384/534 |
| 2,173,561 A | * | 9/1939 | Olson ............................ 384/517 |
| 2,227,697 A | * | 1/1941 | Blood ............................ 451/155 |
| 3,222,991 A | * | 12/1965 | Bone .............................. 409/231 |
| 4,551,032 A | * | 11/1985 | Mottershead .................. 384/517 |
| 4,611,934 A | * | 9/1986 | Piotrowski et al. ............ 384/517 |
| 4,657,412 A | * | 4/1987 | McLarty et al. ............... 384/447 |
| 5,051,005 A | * | 9/1991 | Duncan .......................... 384/517 |
| 5,094,551 A | * | 3/1992 | Kitamura et al. .............. 384/518 |
| 6,851,865 B2 | * | 2/2005 | Nomura et al. ................ 384/544 |

(Continued)

FOREIGN PATENT DOCUMENTS

| JP | 7024687 A | 1/1995 |
| JP | 2000237902 A | 9/2000 |

(Continued)

*Primary Examiner* — Marcus Charles

(57) ABSTRACT

On an outer surface 2b of a spindle 2, a first end surface 2f abutting on one end surface 11d in an axial direction of an inner ring 11 of a first ball bearing 10 is formed so as to be positioned in a plane perpendicular to an axial center, and a second end surface 2c is formed so as to be parallel to the first end surface 2f and be positioned a predetermined distance t apart in the axial direction from the other end surface 11c' in the axial direction of an inner ring 11' of a second ball bearing 10', and a flange member 17 is attachably/detachably fitted to the second end surface 2c so as to come into close contact with the second end surface 2c, and between the flange member 17 and the other end surface 11c' of the inner ring 11', a collar member 19 having an axial-direction dimension slightly longer than the predetermined distance t is interposed.

1 Claim, 2 Drawing Sheets

(56) References Cited

U.S. PATENT DOCUMENTS

| | | | |
|---|---|---|---|
| 7,281,331 B1 * | 10/2007 | Stutsman | 29/898.07 |
| 7,582,007 B2 * | 9/2009 | Sawhill et al. | 452/127 |
| 8,047,750 B2 * | 11/2011 | Mochizuki et al. | 409/231 |
| 2006/0177168 A1 * | 8/2006 | Kitamura et al. | 384/517 |
| 2008/0112769 A1 * | 5/2008 | Mochizuki et al. | 408/124 |
| 2008/0152451 A1 * | 6/2008 | Yamazaki et al. | 409/231 |

FOREIGN PATENT DOCUMENTS

| | | |
|---|---|---|
| JP | 2006125432 A | 5/2006 |
| JP | 2008185062 A | 8/2008 |

* cited by examiner

BEARING PRELOAD STRUCTURE OF MACHINE TOOL

BACKGROUND OF THE INVENTION

1. Field of the Invention

The present invention relates to a bearing preload structure of a machine tool, which gets a preload force in an axial direction to act on a ball bearing.

2. Description of the Related Art

In a spindle device of a machine tool, a spindle is rotatably supported on a spindle head via a ball bearing. As a conventional structure to fix the ball bearing, Japanese Patent Application Laid-open No. Hei 7-24687, for example, discloses one in which nut members fixed to the axial-direction inside of a spindle and a bearing pressing screwed to a male thread portion on an outer periphery of a tip of the spindle fix ball bearings to fixed positions.

Further, Japanese Patent Application Laid-open No. 2000-237902 discloses one in which nuts shrink fitted and fixed to the inside of a spindle and a stepped portion formed at a tip portion of the spindle fixedly position ball bearings.

SUMMARY OF THE INVENTION

However, the structure described in Japanese Patent Application Laid-open No. Hei 7-24687 makes female threads of the bearing pressing and the male thread portion of the spindle difficult to uniformly engage with each other around the whole periphery of the spindle. Thus, it is difficult to make a pressing force of the bearing pressing uniformly act around the whole periphery of the ball bearings. The non-uniform pressing force causes a risk that the spindle is curved in the direction of the weak pressing force, and resulting that the structure is inferior in assembly performance to cause a vibration problem of the spindle.

Further, in the structure described in Japanese Patent Application Laid-open No. 2000-237902, the nuts are necessary to be detachable at the time of changing the bearings, and further a special structure allowing a built-in rotor to be detached also has to be employed. As a result, the structure is complex to cause a problem of an increase in cost.

The present invention has an object to provide a bearing preload structure of a machine tool, which is a simple structure and allows a pressing force to uniformly act around the whole periphery of a ball bearing.

The present invention is a bearing preload structure of a machine tool getting a preload force in an axial direction to act on a ball bearing that has an inner ring, an outer ring, and a plurality of balls, is interposed between an outer surface of a spindle and an inner surface of a spindle head, and rotatably supports the spindle, the bearing preload structure of the machine tool including: a small-diameter portion, an intermediate-diameter portion having a diameter larger than that of the small-diameter portion, and a large-diameter portion having a diameter larger than that of the intermediate-diameter portion that are on the spindle in order from a tip surface side; a first end surface being an end surface, of the large-diameter portion, on an intermediate-diameter portion side and abutting on an axial-direction one end surface of the inner ring and a second end surface being an end surface, of the intermediate-diameter portion, on a small-diameter portion side that are formed on the outer surface of the spindle so as to be parallel to each other and be each positioned in a plane perpendicular to an axial center; and a flange member attachably/detachably fitted to the second end surface so that one portion of the flange member comes into close contact with the second end surface.

According to the present invention, the first end surface abutting on the axial-direction one end surface of the inner ring and the second end surface with which the portion of the flange member comes into close contact can be machined in the same process where attaching/detaching of a workpiece is not performed, so that degree of parallelization of the first end surface and the second end surface can be increased. Further, precision of the portion coming into close contact with the second end surface of the flange member can be obtained only by surface polishing. As a result, the simple structure allows a pressing force by the flange member to uniformly act around the whole periphery of the bearing, and assembly performance can be obtained.

Further, in the case of changing the bearing, only detaching the flange member makes the changing possible, and there is no need to detach a motor and a nut member, so that the bearing change work is easy to be performed.

A preferable embodiment of the present invention further includes: a first ball bearing and a second ball bearing between which an inner ring spacer that restricts axial-direction positions of inner rings and an outer ring spacer that restricts axial-direction positions of outer rings are interposed, in which the first end surface is formed so as to abut on one end surface of the inner ring of the first ball bearing, and the second end surface is positioned a predetermined dimension apart in the axial direction from the other end surface of the inner ring of the second ball bearing, and a collar member is interposed between the other end surface of the inner ring of the second ball bearing and the pressing surface of the flange member.

According to the preferable embodiment, the collar member is interposed between the other end surface of the inner ring of the second ball bearing and the pressing surface of the flange member, so that by setting a length of the above collar member to a length in accordance with a necessary preload force, a preload force acting on the bearings can be adjusted.

DETAILED DESCRIPTION OF THE PREFERRED EMBODIMENT

An embodiment of the present invention will be hereinafter explained is based on the attached drawings.

Figure 1:
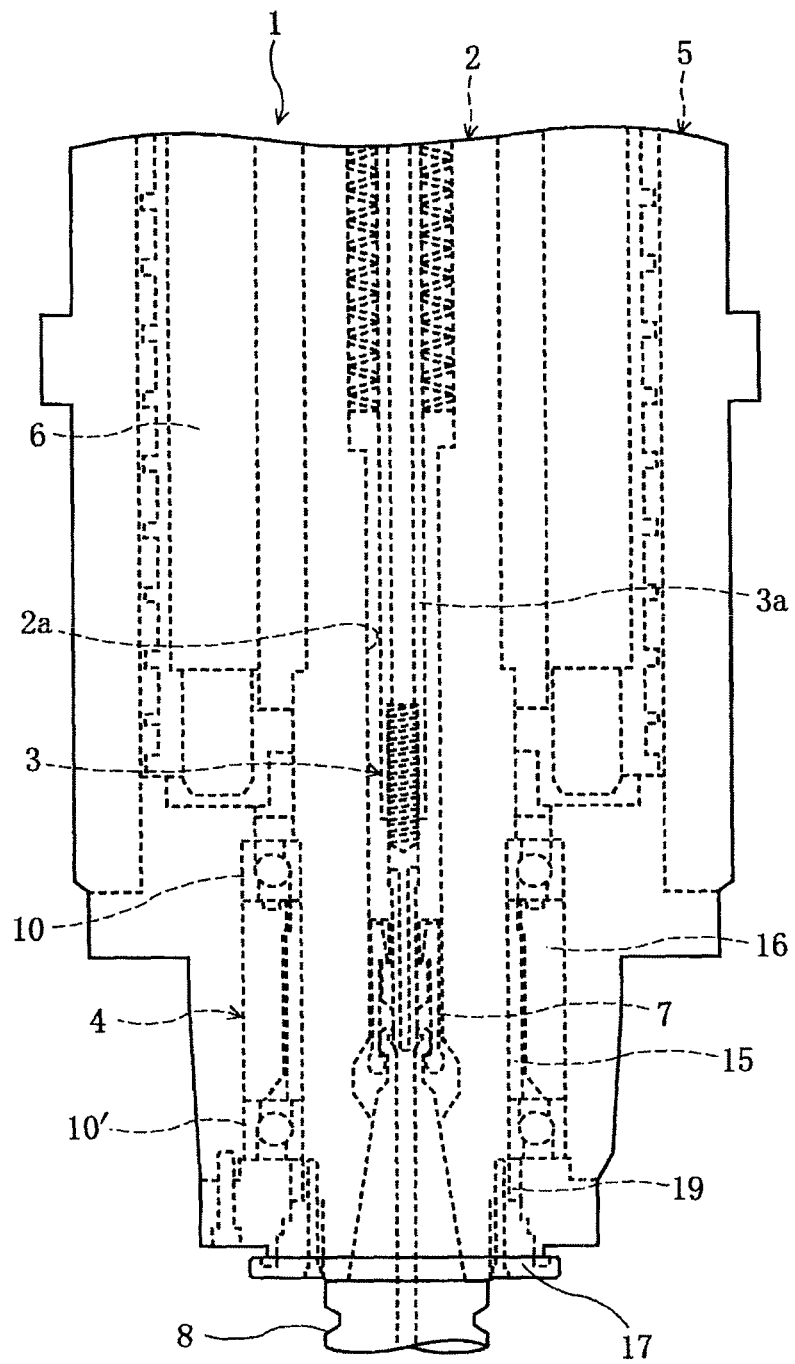
FIG. 1 is a front view showing a spindle device of a machine tool including a bearing preload structure according to an embodiment 1 of the present invention.
Figure 2:
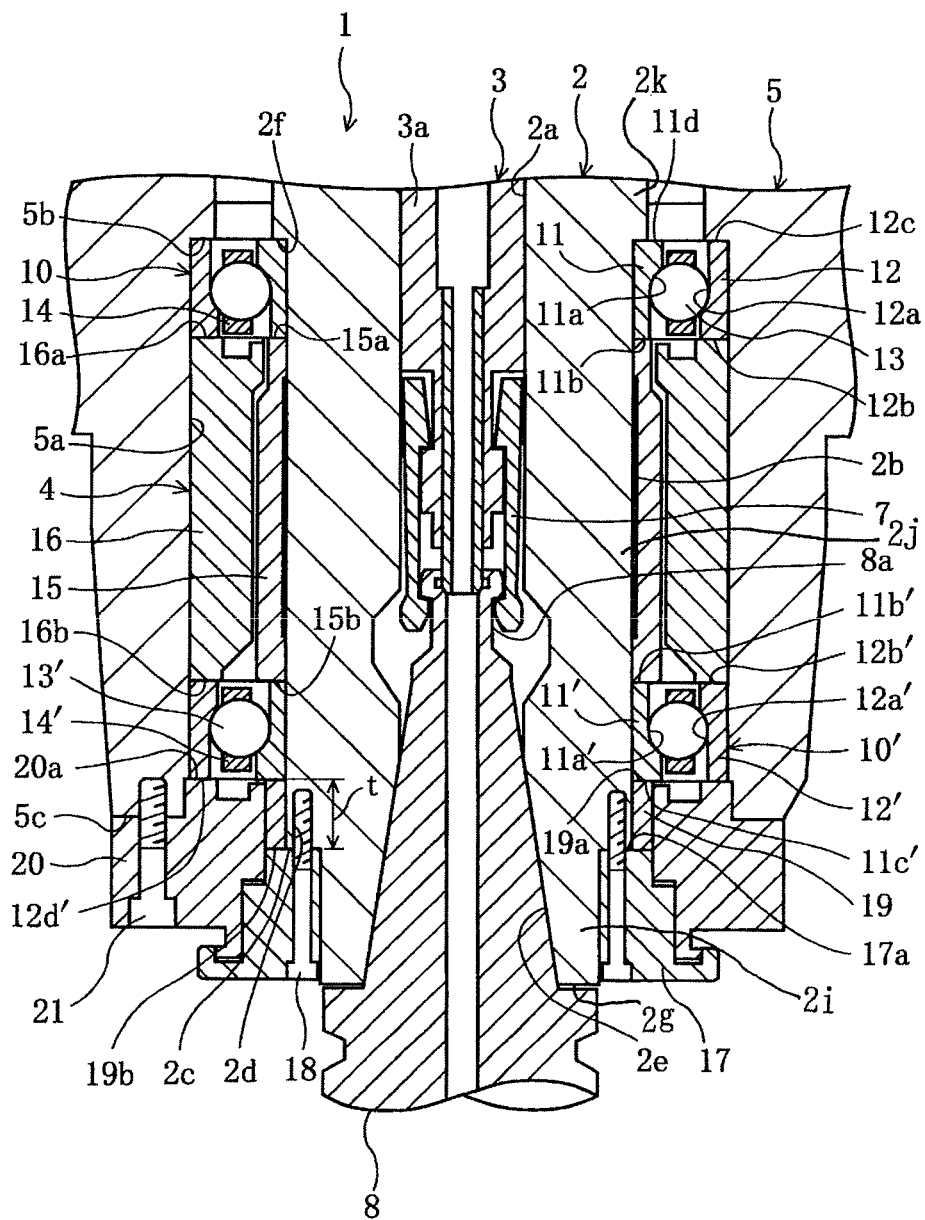
FIG. 2 is a front sectional view showing a portion, of the spindle device, to which bearings are fitted.

FIG. 1 and FIG. 2 are views used to explain a bearing preload structure of a machine tool according to an embodiment 1 of the present invention.

In the drawings, 1 denotes a spindle device of the machine tool. The spindle device 1 includes: a spindle 2; a draw bar unit 3 inserted and disposed in a draw hole 2a formed in an axial center of the spindle 2; and a spindle head 5 rotatably supporting the spindle 2 via a bearing device 4.

A built-in type spindle motor 6 is interposed between the spindle head 5 and the spindle 2, and the spindle 2 is rotary driven by the above spindle motor 6.

The draw bar unit 3 is structured in such a manner that a draw bar 3a is inserted and disposed in the draw hole 2a in the spindle 2 to be movable up and down in an axial direction and a collet chuck 7 disposed at a tip portion of the draw hole 2a is expanded/contracted by a tip of the draw bar 3a to thereby clamp and unclamp a tool holder 8 to/from a tapered hole 2e of the spindle 2.

The bearing device 4 has a first ball bearing 10 and a second ball bearing 10', and an inner ring spacer 15 and an outer ring spacer 16 that restrict axial-direction positions of both the bearings, and the bearing device 4 is interposed between a bearing fitting part 2b of an outer peripheral surface of the spindle 2 and a bearing fitting part 5a of an inner peripheral surface of the spindle head 5. The first and second ball bearings 10, 10' are disposed opposite to each other, and each have an allowable axial load with the same size.

The first ball bearing 10 includes: an inner ring 11 fitted to the bearing fitting part (the outer surface) 2b of the spindle 2; an outer ring 12 fitted to the bearing fitting part 5a of the spindle head 5; a plurality of balls (rolling elements) 13 disposed between an orbital plane 11a of the inner ring 11 and an orbital plane 12a of the outer ring 12; and a cage 14 holding the plurality of balls 13 therein at predetermined pitches.

The second ball bearing 10' similarly includes: an inner ring 11'; an outer ring 12'; a plurality of balls 13' between orbital planes 11 a' and 12a'; and a cage 14'.

Further, the inner ring spacer 15 and the outer ring spacer 16 restrict axial-direction positions of both the inner rings 11 and 11' and both the outer rings 12 and 12' of the first and second ball bearings 10, 10' respectively.

The inner ring spacer 15 has a cylindrical shape having a thickness substantially the same as those of the inner rings 11, 11', and an upper end surface 15a, of the inner ring spacer 15, in the axial direction abuts on a lower end surface 11 b of the inner ring 11 of the first ball bearing 10, and a lower end surface 15b, of the inner ring spacer 15, in the axial direction abuts on an upper end surface 11b' of the inner ring 11' of the second ball bearing 10'.

The outer ring spacer 16 has a cylindrical shape having a thickness thicker than those of the outer rings 12, 12', and an upper end surface 16a, of the outer ring spacer 16, in the axial direction abuts on a lower end surface 12b of the outer ring 12 of the first ball bearing 10, and a lower end surface 16b, of the outer ring spacer 16, in the axial direction abuts on an upper end surface 12b' of the outer ring 12' of the second ball bearing 10'.

On the bearing fitting part 2b of the spindle 2, a first end surface 2f is formed. The above first end surface 2f projects toward a side opposite to the axial center of the spindle 2 and abuts on an axial-direction upper end surface (one end surface) 11d of the inner ring 11 of the first ball bearing 10.

Further, an upper end surface 5b is formed on the bearing fitting part 5a of the spindle head 5 so as to project toward an axial center side and be parallel to the first end surface 2f of the spindle 2, and an upper end surface 12c of the outer ring 12 of the first ball bearing 10 abuts on the upper end surface 5b. Further, to a lower end surface 5c, of the spindle head 5, formed parallel to the upper end surface 5b, an outer ring pressing 20 is attachably/detachably fitted by a plurality of bolts 21. An upper end surface 20a of the above outer ring pressing 20 abuts on a lower end surface 12d' of the outer ring 12' of the second ball bearing 10'. In this manner, the outer rings 12, 12' of the first and second ball bearings 10, 10' are fixed to the predetermined axial-direction positions.

A second end surface 2c is formed on the bearing fitting part 2b of the spindle 2. The above second end surface 2c is formed so as to be parallel to the first end surface 2f and step down to the axial center side from the bearing fitting part 2b. Further, the second end surface 2c is positioned below in the axial direction a predetermined distance t apart from a lower end surface 11c' of the inner ring 11' of the second ball bearing 10'.

Furthermore, in the second end surface 2c, screw holes 2d for attaching a flange member 17 are formed.

The flange member 17 is attachably/detachably fitted to the second end surface 2c by a plurality of bolts 18. The flange member 17 has a ring shape and has a surface polishing process performed on a pressing surface 17a at an upper end thereof, and one portion, of the pressing surface 17a, positioned on an inner peripheral surface side comes into close contact with the second end surface 2c.

Then, a collar member 19 is interposed between a portion, of the pressing surface 17a of the flange member 17, positioned on an outer peripheral surface side and the lower end surface 11c' of the inner ring 11' of the second ball bearing 10'. The above collar member 19 has a cylindrical shape having a surface polishing process performed on an upper end surface 19a and a lower end surface 19b, and has an axial-direction dimension slightly longer than the predetermined distance t. Here, in order to apply a necessary preload to the first and second ball bearing 10, 10', the axial-direction dimension of the collar member 19 is determined by fitting the collar member 19 to the bearing device 4, or determined by a predetermined calculation. In other words, the axial-direction dimension of the collar member 19 is slightly longer than the predetermined distance t, when the collar member 19 is not installed.

The upper end surface 19a of the collar member 19 abuts on the lower end surface 11c' of the inner ring 11' of the second ball bearing 10', and the lower end surface 19b of the collar member 19 abuts on the pressing surface 17a of the flange member 17.

Here, as a result of forming the above-described first end surface 2f and second end surface 2c, the spindle 2 in this embodiment is to have a small-diameter portion 2i, an intermediate-diameter portion 2j, and a large-diameter portion 2k in order from a tip surface 2g. The intermediate-diameter portion 2j is formed to have a diameter larger than that of the small-diameter portion 2i, and the large-diameter portion 2k is formed to have a diameter larger than that of the intermediate-diameter portion 2j. Then, the intermediate-diameter portion 2j is designed to be the bearing fitting part 2b, and further the first end surface 2f is designed to be an end surface, of the large-diameter portion 2k, on an intermediate-diameter portion 2j side, and the second end surface 2c is designed to be an end surface, of the intermediate-diameter portion 2j, on a small-diameter portion 2i side.

In this embodiment, in order to fit the bearing device 4 to the spindle device 1, the first ball bearing 10, the inner ring spacer 15, the outer ring spacer 16, and the second ball bearing 10' are inserted between the bearing fitting part 2b of the spindle 2 and the bearing fitting part 5a of the spindle head 5 in a state of the outer ring pressing 20 and the flange member 17 being detached, and the outer ring pressing 20 is fitted to the lower end surface 5c of the spindle head 5 to fasten the plurality of bolts 21 with uniform torque. Subsequently, the collar member 19 is inserted between the spindle 2 and the outer ring pressing 20, and further the flange member 17 is fitted to the second end surface 2c to fasten the plurality of bolts 18 with torque that is uniform and larger than rigidity of the inner ring spacer and the inner ring of each of the bearings.

Then, a pressing force by the outer ring pressing 20 acts on the outer ring 12 of the first ball bearing 10 from the outer ring 12' of the second ball bearing 10' via the outer ring spacer 16. Further, a pressing force by the flange member 17 is transmitted to the inner ring 11' of the second ball bearing 10' via the collar member 19 to further act on the inner ring 11 of the first ball bearing 10 via the inner ring spacer 15. As the bolts 21 and 18 are fastened, the collar member, the inner ring 11' of the second ball bearing 10', the inner ring spacer 15, and the inner ring 11 of the first ball bearing 10 receive the pressing forces in the axial direction to then come into close contact with one another to thereby be fixed.

According to this embodiment, the first end surface 2f abutting on the axial-direction upper end surface (one end surface) 11d of the inner ring 11 of the first ball bearing 10 and the second end surface 2c with which the pressing surface 17a of the flange member 17 comes into close contact can be machined in the same process where attaching/detaching of a workpiece is not performed, so that degree of parallelization of the first end surface 2f and the second end surface 2c can be increased. Further, each precision of the pressing surface 17a of the flange member 17 and the upper and lower end surfaces 19a, 19b of the collar member 19 can be obtained only by the surface polishing process. Thus, by fastening the plurality of bolts 18 in the flange member 17 with torque that is uniform and larger than rigidity of the inner ring spacer and the inner ring of each of the bearings, the pressing surface 17a of the flange member 17 is allowed to fixedly come into close contact with the second end surface 2c of the spindle 2, and the pressing force by the flange member 17 is allowed to uniformly act on the first and second ball bearings 10, 10' via the collar member 19, and a necessary preload force can be obtained. As a result, it is possible to prevent a problem that a spindle is curved as is caused in a conventional structure, and to obtain assembly performance, and to prevent a problem that the spindle 2 and further the tool holder 8 vibrate.

Further, adjusting the length of the collar member 19 makes it possible to adjust a preload force to act on the bearings, resulting that a necessary preload force can be obtained.

Furthermore, in the case of changing the first and second ball bearings 10, 10', it is only necessary to detach the flange member 17 and the outer ring pressing 20, and there is no need to detach a motor and a nut member as is caused in a conventional structure, resulting that the bearing change work is easy to be performed.

Incidentally, in the above-described embodiment, the case where the collar member 19 is provided between the second ball bearing 10' and the flange member 17 is explained, but in the present invention, the flange member 17 and the collar member 19 may also be integrally formed, and further the above collar member need not always be provided. In the case when no collar member is provided, the lower end surface 11c' of the inner ring 11' of the second ball bearing 10' is structured so as to slightly project downward rather than the second end surface 2c, and thereby the inner ring 11' of the second ball bearing 10' is directly pressed by the flange member 17, resulting that a preload force can be applied to the first and second ball bearings 10, 10'.

Further, in the above-described embodiment, the case where the bearing device 4 has the first ball bearing 10 and the second ball bearing 10' is explained, but it is also possible to apply the present invention to the case where the bearing device 4 has one ball bearing, or three or more ball bearings.

Furthermore, it is desirable that the torque used to fasten the plurality of bolts 18 for fixing the flange member 17 is uniform, but as long as the torque allows the flange member to sufficiently come into close contact with the second end surface 2c under a condition that the degree of parallelization of the first end surface 2f and the second end surface 2c is obtained, the torque need not always be uniform.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A bearing preload structure of a machine tool, in which a ball bearing arrangement made by interposing a plurality of balls between an inner ring and an outer ring, is interposed between an outer peripheral surface of a spindle and an inner peripheral surface of a spindle head and thereby the spindle is rotatably supported by the spindle head, which receives a preload force in an axial direction to act on the ball bearing arrangement, the bearing preload structure comprising:
   a first end surface that is formed on a bearing fitting part of the outer peripheral surface of the spindle and projects toward a side opposite to an axial center from the outer peripheral surface and abuts on a first axial end surface of the inner ring;
   a second end surface formed on the bearing fitting part of the outer peripheral surface of the spindle so as to be parallel to said first end surface and step down to an axial center side from the outer peripheral surface;
   a flange member having a pressing surface, the flange member being secured to the second end surface by bolts; and
   the ball bearing arrangement comprising a first ball bearing has one inner ring and one outer ring and a second ball bearing has one inner ring and one outer ring and disposed therebetween is: an inner ring spacer that restricts axial-direction positions of the inner rings of the first ball bearing and the second ball bearing, and an outer ring spacer that restricts axial-direction positions of the outer rings of the first ball bearing and the second ball bearing, wherein
   said first end surface is formed so as to abut on an end surface of the inner ring of said first ball bearing, on a side opposite to said second ball bearing,
   said second end surface is formed so as to be positioned a predetermined distance t apart in the axial direction from an end surface of the inner ring of said second ball bearing, on a side opposite to said first ball bearing,
   a collar member is interposed between the end surface of the inner ring of said second ball bearing, on the side opposite to said first ball bearing and the pressing surface of said flange member,
   the collar member is a separate structural member that is distinct from the flange member,
   the collar member is configured by securing the flange member to the second end surface by the bolts,
   the collar member has a cylindrical structure of which an inner diameter is constant through an entire length thereof, and is slidable with respect to the spindle, and
   the collar member, when not installed in the bearing preload structure, has an axial direction length longer than the predetermined distance t.

* * * * *